United States Patent [19]

Katra et al.

[11] Patent Number: 6,018,957
[45] Date of Patent: Feb. 1, 2000

[54] METHOD AND APPARATUS FOR CONTROLLING BEATS AND MINIMIZING PULSATION EFFECTS IN MULTIPLE COMPRESSOR INSTALLATIONS

[75] Inventors: Thomas S. Katra, Fayetteville; Richard J. Wood, North Syracuse, both of N.Y.

[73] Assignee: Carrier Corporation, Syracuse, N.Y.

[21] Appl. No.: 09/206,712

[22] Filed: Dec. 7, 1998

[51] Int. Cl.[7] ........................................ F25B 7/00
[52] U.S. Cl. .............................. 62/175; 62/228.4; 62/296
[58] Field of Search ..................... 62/175, 215, 228.4, 62/296, 203, 510

[56] References Cited

U.S. PATENT DOCUMENTS

| | | | |
|---|---|---|---|
| 3,785,167 | 1/1974 | Saha | 62/296 |
| 4,831,836 | 5/1989 | Matsuoka | 62/209 |
| 5,117,642 | 6/1992 | Nakanishi et al. | 62/115 |
| 5,125,241 | 6/1992 | Nakanishi et al. | 62/296 |
| 5,127,235 | 7/1992 | Nakanishi et al. | 62/115 |
| 5,203,178 | 4/1993 | Shyu | 62/180 |
| 5,253,486 | 10/1993 | Sugahara et al. | 62/296 |
| 5,507,151 | 4/1996 | Ring et al. | 62/115 |

*Primary Examiner*—Marc Norman

[57] ABSTRACT

In a refrigeration or air conditioning system employing two positive displacement compressors, one compressor has its speed controlled to exactly match the speed of the other compressor whereby beats between pressure pulsations, structural vibrations and radiated sound are minimized.

8 Claims, 2 Drawing Sheets

METHOD AND APPARATUS FOR CONTROLLING BEATS AND MINIMIZING PULSATION EFFECTS IN MULTIPLE COMPRESSOR INSTALLATIONS

BACKGROUND OF THE INVENTION

Where air conditioning or refrigeration systems have varying load requirements, it is common to have a bank of compressors in the refrigeration circuit. The compressors may have different capacities and can be run individually or in various combinations to provide more efficient operation for the varying load requirements. In positive displacement compressor systems, gas pulsations, vibrations and sound radiation occur at exact integer multiples of compressor running speed. When two, or more, similar positive displacement compressors are operated in the same refrigerant circuit, or in separate refrigerant circuits in the same equipment room, only a slight difference in running speed causes beats to occur due to the slight differences in the frequencies of these phenomena. The beats are both annoying and potentially damaging. Because compressors most commonly use induction motors as drives, these slight differences will occur.

For induction motors, slip is the difference between the actual motor speed and the synchronous speed and is usually expressed as a percentage of the synchronous speed. Slip is necessary to induce current in the rotor conductors. In going from a no load to a full load condition an induction motor will have about a three to ten percent drop in speed.

SUMMARY OF THE INVENTION

In a refrigeration system including two positive displacement compressors which are operated responsive to system requirements, or where compressors for different refrigeration systems are located in the same equipment room, one compressor has its speed controlled to exactly match the speed of the other compressor so as to eliminate beats. A feedback control system and a variable frequency drive, VFD, are employed to match the speeds and to further minimize the amplitude of at least one of the gas pulsation harmonics by additionally controlling the phasing of the VFD driven compressor. Because slip is a function of load, the slight difference between power frequency and rotational frequency typical of induction motors must be accounted for. Where there are more than two compressors, one would be the reference and all of the others would be driven through VFDs responsive to sensed pulsations, or the like.

It is an object of this invention to reduce noise and vibration beats in refrigeration and air conditioning systems employing more than one positive displacement compressor.

It is another object of this invention to minimize the amplitude of at least one of the gas pulsation harmonics.

It is a further object of this invention to minimize the pressure pulsation effect in multiple compressor installations. These objects, and others as will become apparent hereinafter, are accomplished by the present invention.

Basically, in a refrigeration or air conditioning system employing two positive displacement compressors; or where compressors for different refrigeration systems are located in the same equipment room, one compressor has its speed controlled to exactly match the speed of the other compressor whereby beating effects are minimized and the phasing between the two compressors is controlled to minimize pressure pulsation amplitude.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
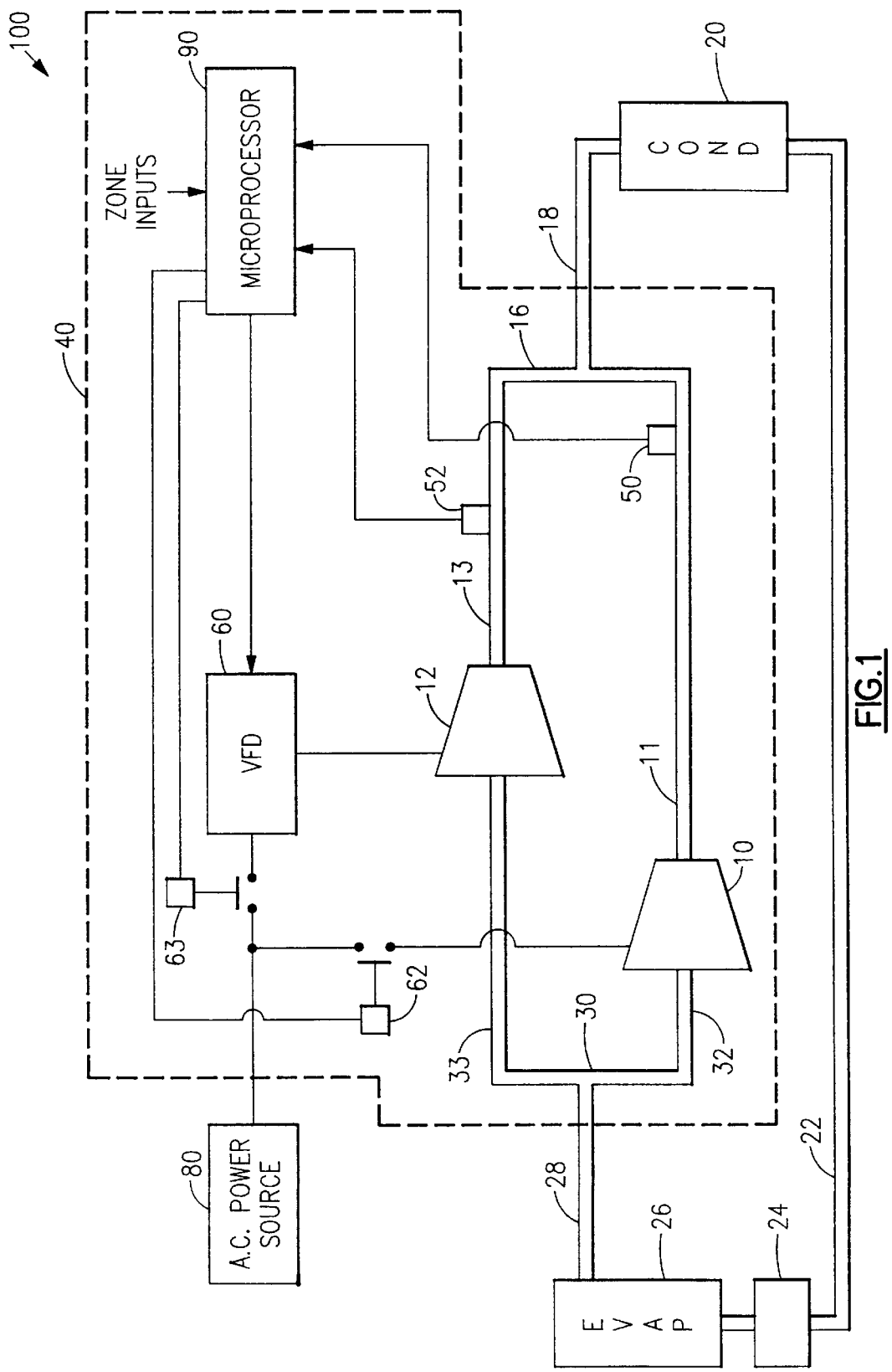
FIG. 1 is a schematic representation of a refrigeration or air conditioning system having plural compressors in parallel employing the present invention.

In FIG. 1, the numeral 100 generally designates a refrigeration system employing a plurality of positive displacement compressors which are located in an equipment room 40. Only the compressors 10 and 12 need to be in equipment room 40, but other structure may be located there. In the case of packaged chillers, for example, all of the structure will be in the equipment room except for the piping for circulating the chilled water. As illustrated, motor-compressors 10 and 12 constitute a bank of compressors and are located in parallel in fluid communication with common discharge manifold 16 via lines 11 and 13, respectively. Discharge manifold 16 is fluidly connected to discharge line 18. Discharge line 18 is connected to condenser 20 which is, in turn, connected via line 22 with expansion device 24. The expansion device 24 may be a thermostatic or electronic expansion valve. Expansion device 24 is fluidly connected to evaporator 26 and evaporator 26 is connected to suction line 28 which feeds suction manifold 30 which, in turn, feeds motor-compressors 10 and 12 via lines 32 and 33, respectively. Microprocessor 90 receives zone inputs and controls the refrigeration system 100 responsive thereto. Accordingly, to the teachings of the present invention microprocessor 90 receives inputs representative of the acoustic/vibrational outputs of compressors 10 and 12. Sensors in the form of dynamic pressure sensors, vibration sensors or microphones may be used. Depending upon the parameter being detected, the sensors may be located on the housings of compressors 10 and 12, on discharge lines 11 and 13, or in proximity thereto in the case of microphones. Accordingly, sensors 50 and 52 can be any of these sensors depending upon the parameter being sensed. Assuming that the dynamic pressure in lines 11 and 13 is to be sensed via dynamic pressure sensors 50 and 52, respectively, then, responsive thereto, control of the speed of compressor 12 will be accomplished via VFD 60. Controlling the speed of compressor 12 permits the elimination of beats while controlling the phase permits controlling the amplitude.

In operation of the system 100, microprocessor 90 receives zone inputs indicative of cooling demand and operates however many compressors are required to meet the cooling demand. Two motor-compressors, 10 and 12, are illustrated but additional compressors may be employed. Each additional compressor would have to be driven through a VFD and would require a sensor corresponding to sensors 50 and 52 sensing the selected parameter for each additional compressor. Motor-compressors 10 and 12 are operatively connected to an AC power source 80 by microprocessor 90 through respective solenoid switch circuits 62 and 63 which are illustrated schematically as solenoid switches connected to microprocessor 90. The motor-compressors may be of different capacity and can be operated individually or in combination. Assuming that motor-compressor 12 is operated in combination with another motor-compressor, 10, they will tend to run at slightly different speeds, resulting in beats, due to the slip characteristics of the induction motors being used. To eliminate the beats, the present invention operates compressor 12 through a VFD 60 set to a slightly different power frequency than the line power supplied by AC power source 80 so as to match the compressor speeds. A suitable parameter is sensed, such as discharge pulsation frequency, for each compressor. Accordingly, dynamic pressure sensors 50 and 52 sense the pressure pulsations in lines 11 and 13, respectively and this information is supplied to microprocessor 90. Microprocessor 90 compares the pulsation frequency and amplitudes sensed by sensors 50 and 52 and controls VFD 60 so as to drive the frequency difference to zero.

Figure 2:
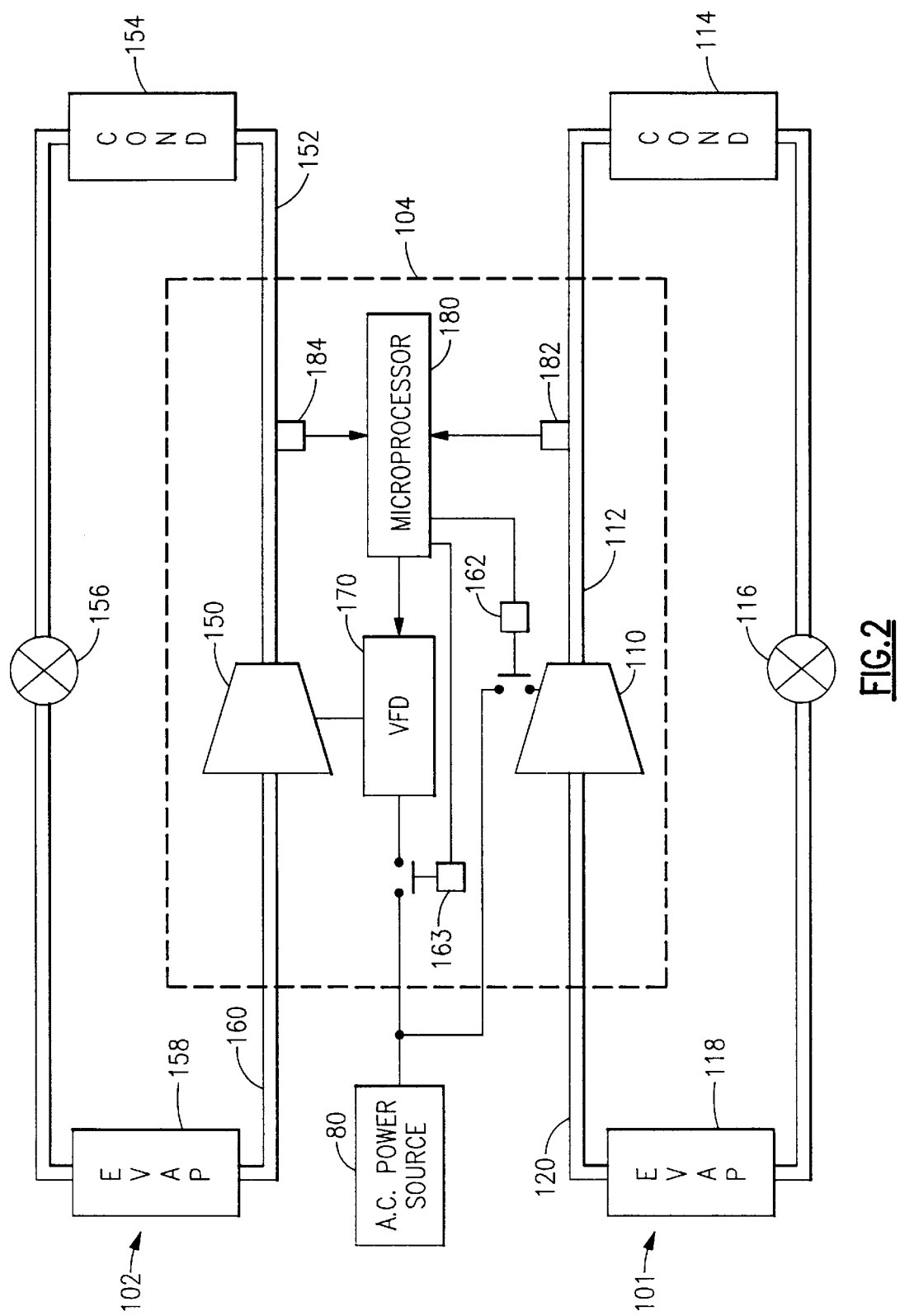
FIG. 2 is a schematic representation of compressors from two different refrigeration systems located in the same equipment room with one being controlled according to the teachings of the present invention.

The present invention is applicable to independent refrigerant systems where similar/identical compressors are located in the same equipment room. In such a situation beats can occur. Referring specifically to FIG. 2, compressor 110, discharge line 112, condenser 114, expansion device 116, evaporator 118 and suction line 120 are serially located in a closed refrigeration system 101. Similarly, compressor 150, discharge line 152 condenser 154, expansion device 156, evaporator 158 and suction line 160 are serially located in a closed refrigeration system 102. Assuming that compressors 110 and 150 are in the same equipment room 104, and are similar/identical, then the simultaneous operation of compressors 110 and 150 can cause beats. As in the FIG. 1 embodiment, one of the compressors, 150, is operated through a variable frequency drive, VFD, 170 by microprocessor 180. Microprocessor 180 is operatively connected to sensors 182 and 184 which are located so as to sense the fluid pressure pulsations, acoustic waves or structural vibrational outputs of compressors 100 and 150, respectively. Responsive to the difference in the signals from sensors 182 and 184, compressor 150 is operated through VFD 170 so as to reduce/eliminate the differences.

Although preferred embodiments of the present invention have been specifically illustrated and described, other changes will occur to those skilled in the art. For example, in addition to matching the speeds so as to eliminate beats, as described above, the phase difference can be controlled so as to achieve cancellation at the location of the combining of the flows, i.e. at the exit of discharge manifold 16. It is therefore intended that the scope of the present invention is to be limited only by the scope of the appended claims.

What is claimed is:

1. Means for reducing beats and pulsation effects in refrigeration systems comprising:

a plurality of compressors located in an equipment room;

means for driving one of said plurality of compressors;

a variable frequency drive for driving another one of said plurality of compressors;

means for sensing a parameter produced by said one compressor and for producing a signal indicative thereof;

means for sensing a parameter produced by said another one of said plurality of compressors and for producing a signal indicative thereof;

said parameter being selected from fluid pressure pulsations, structural vibrations and sound radiation; and means for controlling said variable frequency drive responsive to signals received from said means for sensing a parameter indicative of beats and pulsation effects produced by said one and said another compressor whereby beats and pulsation effects are reduced.

2. The means for reducing pulsation effects of claim 1 wherein said plurality of compressors are located in parallel in a closed refrigeration system.

3. The means for reducing pulsation effects of claim 1 wherein said one and said another compressor are located in separate refrigeration systems.

4. In a closed refrigeration system serially including a bank of compressors connected to a common discharge manifold, a condenser, an expansion device, an evaporator, and a suction manifold connected to said bank of compressors, means for minimizing beats and pulsation effects in said system when at least two compressors in said bank of compressors are operating comprising:

variable frequency drive means for controlling the speed of one of said operating compressors in said bank of compressors;

means for sensing a parameter representative of beats and pulsation effects produced by each operating compressor in said bank of compressors; and means for controlling said variable frequency drive means responsive to said parameter sensed by said means for sensing a parameter whereby beats and pulsation effects in said system are reduced.

5. A method for reducing beats and pulsation effects in refrigeration systems comprising:

sensing a parameter produced by a first compressor and for producing a first signal indicative thereof;

sensing a parameter produced by a second compressor located in the same location as said first compressor and for producing a second signal indicative thereof;

said parameter being selected from fluid pressure pulsations, structural vibrations and sound radiation; and comparing said first and second signals and controlling said first compressor through a variable frequency drive responsive thereto whereby pulsation effects are reduced.

6. The method of claim 5 wherein said first and second compressors are located in parallel in a closed refrigeration system.

7. The method of claim 5 wherein said first and second compressors are located in separate refrigeration systems.

8. In a closed refrigeration system including a bank of compressors connected to a common discharge, a method for minimizing beats and pulsation effects in said system when at least two compressors in said bank of compressors are operating comprising the steps of:

sensing a parameter representative of beats and pulsation effects produced by each operating compressor in said bank of compressors; and controlling the speed of all but one of said operating compressors responsive to said sensed parameter to reduce beats and pulsation effects in said system.

* * * * *